G. P. THOMAS.
METAL PUNCHING MACHINERY.
APPLICATION FILED JUNE 29, 1914.
1,193,631.
Patented Aug. 8, 1916.
3 SHEETS—SHEET 2.
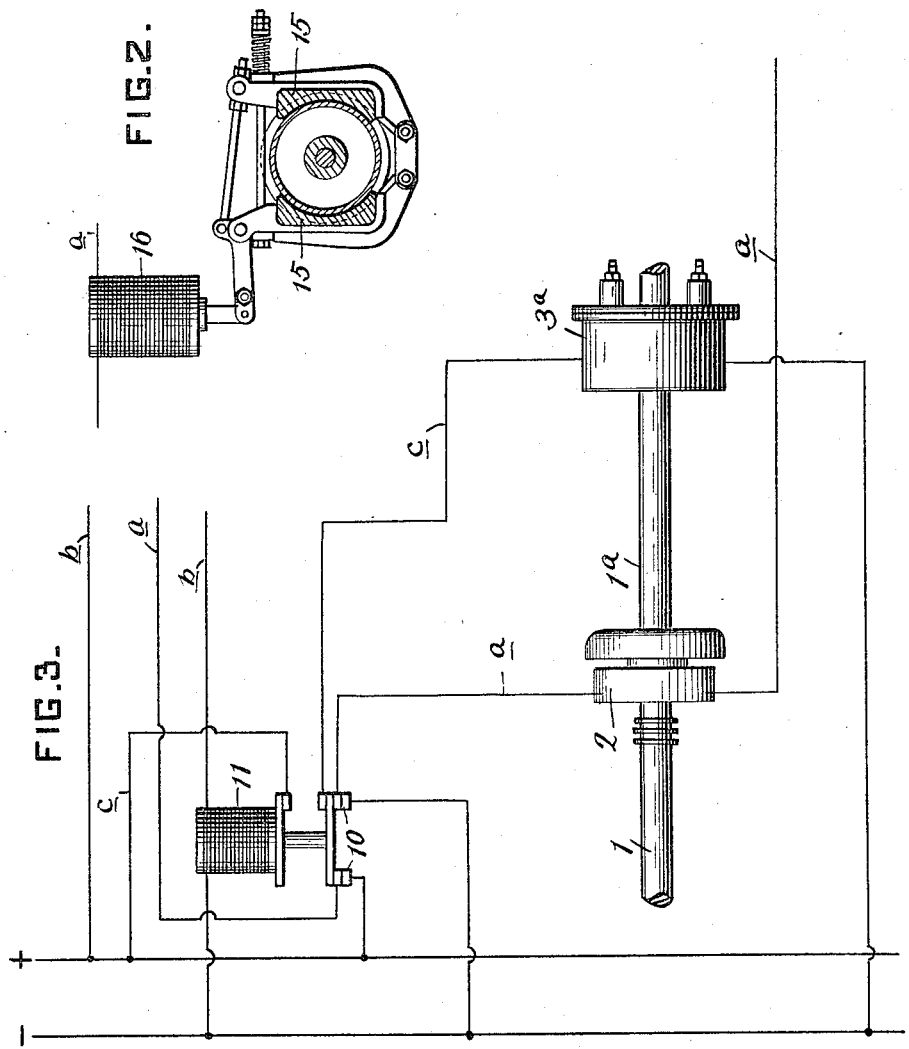

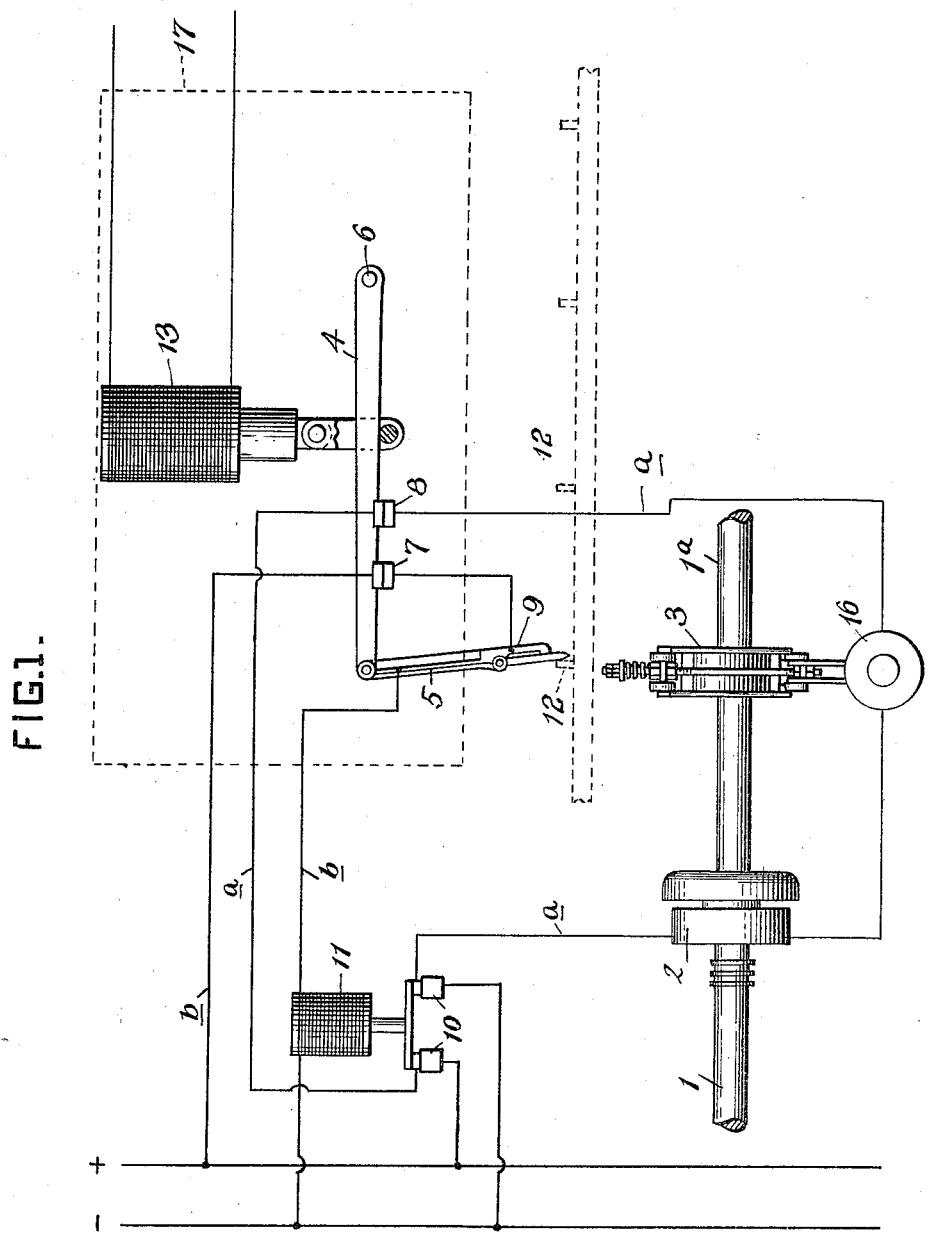

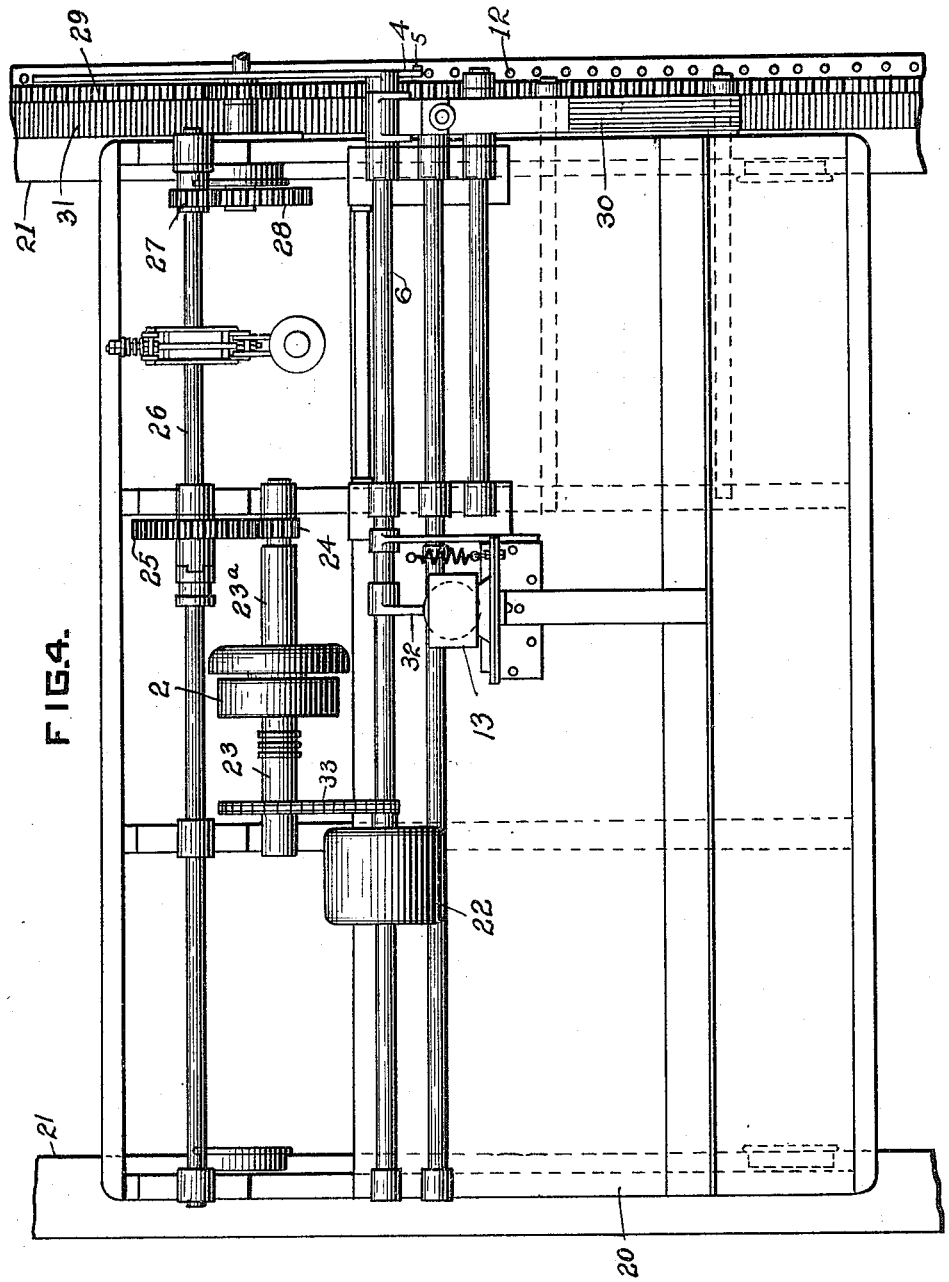

UNITED STATES PATENT OFFICE.

GEORGE PAUL THOMAS, OF GLENSHAW, PENNSYLVANIA.

METAL-PUNCHING MACHINERY.

1,193,631.   Specification of Letters Patent.   Patented Aug. 8, 1916.

Application filed June 29, 1914. Serial No. 847,978.

*To all whom it may concern:*

Be it known that I, GEORGE PAUL THOMAS, residing at Glenshaw, in the county of Allegheny and State of Pennsylvania, a citizen of the United States, have invented or discovered certain new and useful Improvements in Metal-Punching Machinery, of which improvements the following is a specification.

My invention consists in improvements in metal-punching machinery.

In United States Letters Patent No. 835,123, granted me November 6, 1906, I have shown and described the combination of a metal punch and a work carriage, the said work carriage being provided with a movable support, from which movable support is suspended a pivoted finger. The construction also includes a succession of abutments, arranged adjacent the runway of the carriage. Against these abutments the pivoted finger bears as the carriage advances and, swinging aside, effects the stopping of the carriage. In this same patent I show both a hand-power carriage drive and an electrical carriage drive, and in connection with the electrical carriage drive I show means for interrupting the propulsion of the carriage upon the swinging of the pivoted finger. In Letters Patent, No. 886,551, granted me May 5, 1908, I have shown a brake applicable to the driving shaft of a carriage of such a machine. In Letters Patent No. 1,068,465, granted me July 29, 1913, I have shown such a carriage driven by an electrical motor with clutch and brake parts interposed between the motor and the parts which, borne by the carriage, engage the runway. In an application Serial No. 841,332, filed by me May 27th, 1914, I have shown and described in combination with and as part of a metal-punching machine, a punch movable transversely in the head of the machine, means for effecting transverse movement of the punch while the machine continues its cycle of operations, and a carriage with such parts as those already indicated in connection with the work carriage of the earlier patents for controlling the position of the said movable punch in the punching head as the operation of the machine progresses.

My present invention has to do with the structure of that carriage and the parts with which it is coördinated, whether the carriage be the work carriage of the earlier patents or the carriage by which the lateral shifting of the punch is controlled (the carriage of the application referred to.)

The accompanying drawings illustrate my invention.

Figure 1 is a diagrammatic representation of various operating elements and of their electrical connections; Fig. 2 is a view, partly in section and partly in elevation, of a detail of construction; Fig. 3 is a view similar to Fig. 1 but showing a modification thereof; and Fig. 4 is a plan view of a carriage and runway, the electrical connections being omitted.

I will first explain my invention as illustrated in the diagrammatic views, and thereafter as shown assembled and coördinated in Fig. 4.

Referring to Fig. 1, 1 indicates a driving shaft and 1ª a driven shaft. The shaft 1 may be the driving shaft of the work carriage shown in the earlier patents referred to, or it may be the driving shaft for impelling the punches laterally in the punching head, as in the application referred to. Whether it be the one or the other is immaterial to the present invention. The shafts 1, 1ª as indicated are connected through a magnetic clutch 2. I show this clutch diagrammatically; its structure forms no part of my present invention; but, for the sake of definiteness it may be understood to be in structure such as that shown and described in my Patent No. 1,068,465, already referred to. A brake 3 is furnished for the driven shaft 1ª. It may, for example, be in structure such a spring-actuated brake as is shown and described in my Patent No. 886,551, already referred to; but, whatever be its structure in detail, its characteristic feature is that it is maintained inactive by the maintenance of an electric current. This is indicated in Fig. 2, wherein the spring-actuated brake shoes 15 are held retracted by electro-magnets 16. The clutch and the brake may be for the ends described (and preferably will be) arranged in a single electric circuit, which circuit when closed and carrying a current will maintain the clutch effective and the brake ineffective and when broken will leave the clutch ineffective and allow the brake to act.

The carriage, whether of one kind or of the other, is indicated diagrammatically at 17, Fig. 1. It will be understood that carriage 17 and driven shaft 1ª are mounted, one upon the other, or are otherwise correlated mechanically, so that they are conditioned to move together. The support movable in the carriage is indicated at 4, and upon it is pivoted a finger 5 which normally hangs free. It will be understood that the support 4 is mounted in the carriage and further illustration is not necessary in view of the showing of the earlier patents and the foregoing description. In this case the support 4 is pivoted, as at 6. It will be understood that by the movement of the support 4 on its pivot 6 the finger 5 will be bodily raised and lowered.

Two make-and-break devices 7 and 8, which may be of any preferred form and are shown simply to consist of pairs of contact pieces, have each of them one part borne by the movable support 4. When the support 4 is in its lowermost position both of these contacts are closed. When it is raised both of them are open. A third make-and-break device 9 is opened and closed by the swinging of finger 5 on its pivot. It is preferably (though not necessarily) made by relatively movable parts forming part of the finger itself, which two movable parts are swung to and from contact the one with the other when the finger is swung on its pivot.

The operation of clutch 2 and brake 3 is controlled by and conditioned on the swinging of the member 4. Preferably a single circuit $a$ is provided for the energizing current for clutch 2 and the brake-restraining current of brake 3; it is closed through one of the contact pieces borne by arm 4 as for example through contact piece 8. This same circuit $a$ includes also a make-and-break device 10, controlled by an electromagnet 11. When the electromagnet 11 is deënergized the circuit is closed through the make-and-break device 10; when it is energized the device is opened and the circuit broken. The circuit $b$ is the circuit through which the electro-magnet 11 is energized, and in it are arranged the two other electric contacts 7 and 9. The circuit $b$ may, as shown, be arranged in multiple arc with circuit $a$ and derive its flow of current from a common source. This however will be understood not to be necessary.

The finger 5 is caused to swing on its pivot as the carriage progresses by engaging a succession of abutments 12 arranged adjacent the path of travel of the carriage. These abutments and their function are sufficiently described and understood and do not require further explanation here. It will of course be understood that in place of the abutment 12 the finger 5 may be swung aside manually, but in an automatic machine the abutments will be provided.

The swinging of the support 4 may be effected by means of an electro-magnet 13 energized intermittently in the cycle of operation of the machine and, conveniently, by the reciprocation of the punching head. It will be understood that the support 4 also may be manually operated, but in an automatic machine it may be operated in such manner as indicated that the cycle of movements shall follow in proper order.

The reason for a second contact 7 in the circuit $b$ which controls the electro-magnet 11 is this: The contact 9 is preferably a contact which, while capable of being made on the swinging aside of the finger, shall also be capable of being freely broken to allow the finger to swing freely to normal position under the force of gravity. A certain delicacy is therefore desirable, that the finger 5 may be at once efficient to close the circuit and freely responsive to the force of gravity. Accordingly, while contact 9 is relied upon to close this circuit, contact 7 is relied upon to break it. When the circuit is broken, the somewhat delicate member 5 with its several parts will be free to resume normal inactive position.

A few words will be sufficient to describe the operation. Normally support 4 is down in its circuit-closing position, shown in Fig. 1. A current from any suitable source is flowing, maintaining clutch 2 closed and brake 3 open; and, accordingly, shaft $1^a$ is responsive to the drive, of whatever nature it may be. This current, controlling clutch and brake, is made through circuit $a$. As the shaft 1 turns, the carriage advances. In the course of the carriage advance finger 5 makes contact with an abutment 12 and swings aside, and when it swings aside, contact 9 is closed, circuit $b$ is completed through contact 9 and contact 7, and the current which flows through this circuit energizes the magnet 11 and opens the make-and-break device 10. When the make-and-break device 10 is opened circuit $a$ is broken; clutch 2 is opened; and brake 3 is applied. Thus the rotation of shaft $1^a$ is interrupted. This condition of things continues until, in the cycle of operation of the machine as a whole, electro-magnet 13 is in succession first energized and then deënergized. When magnet 13 is energized, support 4 is raised, turning on the pivot 6. The raising of support 4 breaks contacts 7 and 8 and raises finger 5 so that it swings free of the pin 12 which it has last engaged. Inasmuch as the breaking of contact 7 has broken the circuit $b$, the make-and-break device 9 borne by the finger 5 will separate under the action of gravity without any arcing or any impeding whatever of the free opening. Further progress of the operation of the machine as a whole will cause electromagnet 13 to be deënergized again, and when it is deënergized support 4 will descend again of its own weight, finger 5 will come again to stop-engaging position, and contacts 7 and 8 will be closed. Inasmuch as the raising of the arm 4 has deënergized electro-magnet 11 and allowed make-and-break device 10 to close, the closing of the contact 8 on the descent of the support 4 will complete again circuit *a* and effect the driving of the carriage forward. The closing of the contact 7 will not interfere with this because contact 9 will stand open, until finger 5 again engages another abutment 12; at which time the succession of operations now described will be repeated.

I have described a brake which may be used as the spring-actuated brake of the character shown in my Patent No. 886,551. The particular character of brake is not important. In Fig. 3 I have shown the manner in which an electrically operated brake may be connected. In this case the brake is indicated diagrammatically at 3ª, and the circuit which controls it is indicated by *c*. This circuit is closed by the actuation of solenoid 11 which, operating to open circuit *a*, at the same time closes circuit *c* through contact pieces 10 provided for this purpose.

Referring now to Fig. 4, a spacing or work carriage, including a frame 20, is shown mounted upon a spacing table 21 provided at one side with a plurality of pins or abutments 12 set at the desired spacing intervals. The carriage is driven by means of a motor 22, the rotor of which is connected, through a chain 33, to a divided shaft 23, 23ª, to each part of which is secured one of the elements of the magnetic clutch 2. To the shaft part 23ª there is secured a pinion 24 which meshes with a pinion 25 secured to a shaft 26, and to the latter shaft there is secured a second pinion 27 meshing with a pinion 28 which engages a rack 29 attached to the table 21. As shown herein, the brake 3 is adapted to act upon the shaft 26 in the manner already explained. The stopping of the carriage in this particular embodiment of my invention is effected by means of a plurality of pawls 30 adapted, when released, to engage a detent bar 31 secured to the table 21 in a manner fully explained in my Letters Patents No. 908,818 and No. 1,068,465. In the carriage of Fig. 4 the arm 4 is somewhat shorter than that diagrammatically shown in Figs. 1 and 3, and it is rigidly secured to a shaft 6 to which there is secured a second arm 32 adapted to be lifted by means of the electro-magnet 13. It will be understood that the swinging finger 5 is pivotally suspended from the outer end of the arm 4, and that such arm and finger are provided with the contacts already explained with reference to Fig. 1.

I claim as my invention:

1. In a metal-punching machine the combination of a carriage runway, a carriage movable upon said runway, a support movable in said carriage, a finger pivoted to said support, a succession of abutments arranged adjacent said runway and in operative relation to said pivoted finger, a make-and-break device operated by the swinging of said finger on its pivot and arranged in an electric circuit controlling carriage advance, and a second make-and-break device operated by the movement of said support and arranged in the same circuit with the make-and-break device first named.

2. In a metal-punching machine the combination of a carriage runway, a carriage movable on said runway, a support movable in said carriage, a finger pivoted to said support, a succession of abutments arranged adjacent said runway and in operative relation to said pivoted finger, an electric circuit controlling carriage advance, a make-and-break device in said circuit controlled by the movement of the support above named, a second make-and-break device in said circuit, an electro-magnet controlling said second make-and-break device, and means for energizing said electro-magnet upon the swinging of said pivoted finger.

3. In a metal-punching machine the combination of a carriage runway, a carriage movable thereon, an arm pivoted in said carriage, a finger pivoted in said arm, two electric contacts closed when said arm is in lowered position and opened when said arm is raised, a third electric contact, closed when said finger is swung aside and opened when said finger hangs free from its pivot, a circuit controlling carriage advance closed through one of the contacts first named, a make-and-break device in said circuit controlled by an electro-magnet, and magnet-energizing circuit closed through the second other of said first named contacts and through the third contact named above.

4. In a metal-punching machine the combination of a punch, a carriage runway, and a carriage; a stopping-mechanism including an element movable automatically at predetermined intervals in the range of carriage advance, an electric circuit containing two make-and-break elements, one of said elements remaining normally closed and the other closing periodically on the movement of the movable element mentioned above; means operating in sequence after the closing of the second make-and-break element and opening the first named make-and-break element.

In testimony whereof I have hereunto set my hand.

GEORGE PAUL THOMAS.

Witnesses:
  BAYARD H. CHRISTY,
  FRANCIS J. TOMASSON.

Copies of this patent may be obtained for five cents each, by addressing the "Commissioner of Patents, Washington, D. C."